(12) United States Patent
Pang et al.

(10) Patent No.: US 10,902,296 B2
(45) Date of Patent: Jan. 26, 2021

(54) METHOD AND APPARATUS FOR TRAINING CLASSIFICATION MODEL, METHOD AND APPARATUS FOR CLASSIFYING

(71) Applicant: FUJITSU LIMITED, Kanagawa (JP)

(72) Inventors: Zhanzhong Pang, Beijing (CN); Xiaoyi Yu, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 16/445,240

(22) Filed: Jun. 19, 2019

(65) Prior Publication Data
US 2019/0392260 A1 Dec. 26, 2019

(30) Foreign Application Priority Data
Jun. 25, 2018 (CN) .......................... 2018 1 0663447

(51) Int. Cl.
*G06K 9/62* (2006.01)
*G06K 9/46* (2006.01)

(52) U.S. Cl.
CPC ............. *G06K 9/6262* (2013.01); *G06K 9/46* (2013.01); *G06K 9/627* (2013.01); *G06K 9/628* (2013.01); *G06K 9/6259* (2013.01)

(58) Field of Classification Search
CPC ...... G06K 9/6262; G06K 9/46; G06K 9/6259; G06K 9/627; G06K 9/628; G06K 9/6256; G06K 9/6267
See application file for complete search history.

(56) References Cited

U.S. PATENT DOCUMENTS

| | | | |
|---|---|---|---|
| 2018/0063538 A1* | 3/2018 | Bernal | H04N 5/23296 |
| 2019/0042867 A1* | 2/2019 | Chen | G06N 5/022 |
| 2020/0005154 A1* | 1/2020 | Herbster | G06N 10/00 |

OTHER PUBLICATIONS

Karol Gregor et al: "DRAW: A Recurrent Neural Network for Image Generation", May 20, 2015 (May 20, 2015), XP055639674, Retrieved from the Internet: URL:https://arxiv.org/pdf/1502.04623.pdf [retrieved on Nov. 6, 2019].

(Continued)

*Primary Examiner* — Phuoc Tran
(74) *Attorney, Agent, or Firm* — Xsensus LLP

(57) ABSTRACT

Disclosed are a method and apparatus for training a classification model and a method and apparatus for classifying. A method for classifying comprises: extracting a feature from to-be-tested information inputted to a classification model having been trained; compressing the extracted feature into a low dimensional hidden feature capable of representing the to-be-tested information; performing decompression on the hidden feature to obtain a decompressed feature; performing rebuilding on the to-be-tested information based on the decompressed feature, to obtain reconstructed to-be-tested information; judging, based on a rebuild loss between the to-be-tested information and the reconstructed to-be-tested information, whether the to-be-tested information belongs to a known class or an unknown class; and performing classification on the to-be-tested information, via the classification model having been trained, in a case where it is determined that the to-be-tested information belongs to a known class.

20 Claims, 6 Drawing Sheets

(56) References Cited

OTHER PUBLICATIONS

Huxi Jiang et al: "Variational Deep Embedding: An Unsupervised and Generative Approach to Clustering", Proceedings of the Twenty-Sixth International Joint Conference on Artificial Intelligence, Aug. 1, 2017 (Aug. 1, 2017), pp. 1965-1972, XP055639676, California, US DOI: 10.24963/jcai.2017/273 ISBN: 978-0-9992411-0-3.
Extended European Search Report dated Nov. 15, 2019, issued in corresponding European Patent Application No. 19180825.2.

* cited by examiner

METHOD AND APPARATUS FOR TRAINING CLASSIFICATION MODEL, METHOD AND APPARATUS FOR CLASSIFYING

CROSS-REFERENCE TO RELATED APPLICATIONS

This application claims the priority benefit of Chinese Patent Application No. 201810663447.5, filed on Jun. 25, 2018 in the China National Intellectual Property Administration, the disclosure of which is incorporated herein in its entirety by reference.

FIELD OF THE INVENTION

The present disclosure relates to the field of information processing, and particularly to a method and apparatus for training a classification model which are capable of obtaining a classification model for quickly and accurately classifying to-be-tested information, and a method and apparatus for classification prediction which are capable of quickly and accurately classifying to-be-tested information.

BACKGROUND OF THE INVENTION

Currently, a classification task is generally performed on a closed set, that is, it is assumed that there is complete data to handle each to-be-tested class appearing in actual testing. In general cases, however, since we do not have enough priori knowledge, unknown classes which are not contained in a training set not only cannot be detected but also will be mistakenly classified into known classes if they appear during testing. For example, in ancient Chinese prose recognition, since there are many kinds of and a large number of ancient Chinese prose and each kind of ancient Chinese prose often has many variants, it is hard to collect all the classes of ancient Chinese prose. Therefore, in ancient Chinese prose recognition, a situation where unknown classes appear will often occur. In this situation, the entire classification task not only shall be capable of correctly recognizing known classes but also shall be capable of distinguishing unknown classes which appear. Such a problem is right the problem to be solved under open set background.

At present, various solution methods such as clustering based method, semi-supervised learning based classification and statistical theory based method have been proposed for open set problems. Reconstruction errors based recognition is one of the most popular techniques with the highest accuracy. The main idea behind this algorithm is setting up a reconstruction network. The reconstruction network has been trained, and can compress and rebuild samples when given an input. Therefore, the better the reconstruction effect, the less the reconstruction error. When data from unknown classes appears, it is supposed to engender an error larger than a threshold we choose beforehand, while for data from known classes, the error would be much smaller.

Nevertheless, some data from known and unknown classes will be mixed with each other and hard to be correctly recognized.

SUMMARY OF THE INVENTION

A brief summary of the present disclosure is given below to provide a basic understanding of some aspects of the present disclosure. However, it should be understood that the summary is not an exhaustive summary of the present disclosure. It does not intend to define a key or important part of the present disclosure, nor does it intend to limit the scope of the present disclosure. The object of the summary is only to briefly present some concepts about the present disclosure, which serves as a preamble of the more detailed description that follows.

In view of the above problems, an object of the present disclosure is to provide a method and apparatus for training a classification model and a method and apparatus for classifying which are capable of solving one or more deficiencies in the prior art.

According to an aspect of the present disclosure, there is provided a method for training a classification model, comprising: a sample processing step, a rebuild loss calculating step, an inter-class loss calculating step and a classification model obtaining step. In the sample processing step, the following processing are performed with respect to each sample in a training set respectively: extracting a feature from the sample; compressing the extracted feature into a low dimensional hidden feature capable of representing the sample; performing decompression on the hidden feature to obtain a decompressed feature; and performing rebuilding on the sample based on the decompressed feature, to obtain a reconstructed sample. In the rebuild loss calculating step, a rebuild loss is calculated with respect to all samples in the training set based on the hidden features; in the inter-class loss calculating step, an inter-class loss indicating a separation degree between samples of different classes is calculated with respect to all samples in the training set; and in the classification model obtaining step, a classification model which has been trained is obtained by minimizing a loss function comprising the rebuild loss and the inter-class loss.

According to another aspect of the present disclosure, there is provided a method for classifying, comprising: an extracting step of extracting a feature from to-be-tested information inputted to a classification model having been trained; a compressing step of compressing the extracted feature into a low dimensional hidden feature capable of representing the to-be-tested information; a decompressing step of performing decompression on the hidden feature to obtain a decompressed feature; a reconstructing step of performing rebuilding on the to-be-tested information based on the decompressed feature, to obtain reconstructed to-be-tested information; a judging step of judging, based on a rebuild loss between the to-be-tested information and the reconstructed to-be-tested information, whether the to-be-tested information belongs to a known class or an unknown class; and a classifying step of performing classification on the to-be-tested information, via the classification model having been trained, in a case where it is determined that the to-be-tested information belongs to a known class.

According to still another aspect of the present disclosure, there is provided an apparatus for classifying, comprising: an extracting unit configured to extract a feature from to-be-tested information inputted to a classification model having been trained: a compressing unit configured to compress the extracted feature into a low dimensional hidden feature capable of representing the to-be-tested information; a decompressing unit configured to perform decompression on the hidden feature to obtain a decompressed feature; a reconstructing unit configured to perform rebuild on the to-be-tested information based on the decompressed feature, to obtain reconstructed to-be-tested information; a judging unit configured to judge, based on a rebuild loss between the to-be-tested information and the reconstructed to-be-tested information, whether the to-be-tested information belongs to a known class or an unknown class; and a classifying unit configured to perform classification on the to-be-tested information, via the classification model having been trained, in a case where it is determined that the to-be-tested information belongs to a known class.

According to other aspects of the present disclosure, there is further provided a computer program code and a computer program product for implementing the above method according to the present disclosure, as well as a computer readable storage medium having recorded thereon the computer program code for implementing the above method according to the present disclosure.

Other aspects of embodiments of the present disclosure will be given in the following specification part, wherein preferred embodiments for sufficiently disclosing embodiments of the present disclosure are described in detail, without applying limitations thereto.

BRIEF DESCRIPTION OF THE DRAWINGS

The present disclosure can be better understood with reference to the detailed description given in conjunction with the appended drawings below, wherein throughout the drawings, same or similar reference signs are used to represent same or similar components. The appended drawings, together with the detailed descriptions below, are incorporated in the specification and form a part of the specification, to further describe preferred embodiments of the present disclosure and explain the principles and advantages of the present disclosure by way of examples. In the appended drawings.

EMBODIMENTS OF THE INVENTION

Hereinafter, exemplary embodiments of the present disclosure will be described in detail in conjunction with the appended drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should also be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure.

Embodiments of the present disclosure will be described in detail in conjunction with the drawings below.

Figure 1:
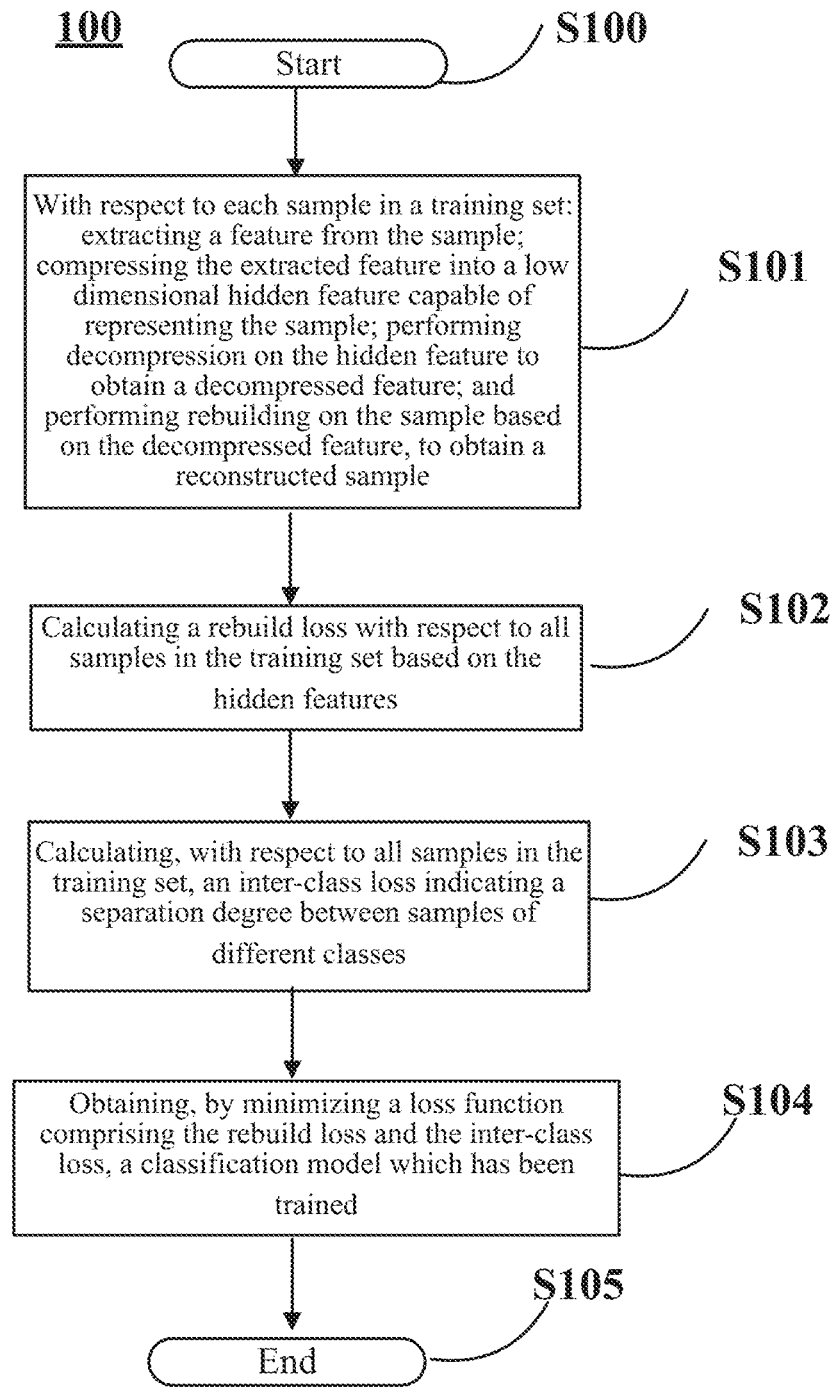
FIG. 1 is a flowchart showing a method for training a classification model according to an embodiment of the present disclosure.

Firstly, a flow example of a method 100 for training a classification model according to an embodiment of the present disclosure will be described with reference to FIG. 1. FIG. 1 is a flowchart showing the method 100 for training a classification model according to the embodiment of the present disclosure. As shown in FIG. 1, the method 100 for training a classification model according to the embodiment of the present disclosure comprises a sample processing step S101, a rebuild loss calculating step S102, an inter-class loss calculating step S103 and a classification model obtaining step S104.

The method 100 for training a classification model according to the embodiment of the present disclosure starts at S101.

In the sample processing step S101, it is possible to perform the following processing with respect to each sample in a training set respectively: extracting a feature from the sample; compressing the extracted feature into a low dimensional hidden feature capable of representing the sample; performing decompression on the hidden feature to obtain a decompressed feature; and performing rebuilding on the sample based on the decompressed feature, to obtain a reconstructed sample.

As an example, the sample may be text or other common pictures. It is assumed to represent the sample by x. For example, it is possible to extract a feature of each sample x using a convolution layer while considering spatial correlation information among pixels, and the extracted feature is generally a high dimensional feature. Therefore, for example, in the method 100 for training a classification model according to the embodiment of the present disclosure, it is possible to extract a feature of a sample while considering spatial correlation information among pixels.

It is possible to compress a high dimensional feature extracted from each sample x into a low dimensional hidden feature z capable of representing the sample x. It is possible to accelerate training on the classification model by representing the sample using a low dimensional hidden feature.

It is possible to perform decompression on the hidden feature z to obtain a decompressed feature.

It is possible to perform rebuilding on the sample x based on the decompressed feature, to obtain a reconstructed sample x'.

As an example, a Variational Autoencoder (VAE) is utilized, it is assumed that samples are generated through control by latent variables which have certain posterior distributions, and the VAE tries to learn a posterior distribution $p(z|x)$ of hidden samples given an input sample x using the above compression processing (which may be called encoder), and rebuilds the input sample x from a likelihood distribution $p(x|z)$ learned in the above compression processing (which may be called decoder). As the reconstruction process follows its posterior distribution in the encoder, it gets better generalization performance, and can rebuild samples more precisely than ordinary autoencoders, especially when the hidden features are in extremely low dimensions.

In the rebuild loss calculating step S102, it is possible to calculate a rebuild loss with respect to all samples in the training set based on the hidden features.

Preferably, the rebuild loss may comprise a generation loss indicating a difference between each sample x and its reconstructed sample x' and a latent loss indicating a matching degree between a distribution of the hidden feature z and a specific distribution.

As an example, the generation loss may measure an accuracy degree of the reconstruction process, and the latent loss may measure a matching degree between the hidden feature and the specific distribution.

Assuming that there are a total of N samples in the training set, the generation loss Lg may be represented as follows:

$$Lg = \frac{1}{N}\sum_{0=1}^{N}\|x_i - x'_i\|_2 \quad (1)$$

In the expression (1), $x_i$ and $x_i'$ represent an i-th sample and its reconstructed sample respectively, where i=1, 2, . . . , N.

Assuming that the specific distribution is a unit Gaussian distribution N(0,1), i.e., assuming that the hidden feature z substantially follows a unit Gaussian distribution, the latent loss may be represented as follows:

$$Ll = KL(p(z|x), N(0,1)) \quad (2)$$

In the expression (2), N(0,1) is a probability density function of a unit Gaussian distribution, and KL( ) represents a KL distance.

The rebuild loss Lvae may be represented as follows:

$$Lvae = Lg + Ll \quad (3)$$

In the inter-class loss calculating step S103, an inter-class loss indicating a separation degree between samples of different classes is calculated with respect to all samples in the training set.

Preferably, in the inter-class loss calculating step S103, it is possible to calculate a softmax loss as the inter-class loss based on a hidden feature of each sample.

To make a difference between different classes as large as possible. i.e., to separate features of different classes as far as possible, it is possible to calculate a softmax loss La based on a hidden feature of each sample as follows:

$$Ls = -\sum_{i=1}^{N}\frac{e^{W_{y_i}z_i+b_{y_i}}}{\sum_{j=1}^{m}e^{W_j z_i+b_j}} \quad (4)$$

In the expression (4), $z_i$ is a hidden feature of an i (i=1, 2, . . . , N)-th sample, m is the number of known classes, $W_{y_i}$ and $b_{y_i}$ represent classification model parameters corresponding to a class $y_i$ to which the hidden feature z belongs respectively, and $W_j$ and $b_j$ (j=1,2, . . . , m) represent classification model parameters corresponding to a j-th class among the m known classes respectively.

Besides the softmax loss, those skilled in the art can also readily envisage other calculation manners of the inter-class loss, which will not be repeatedly described herein.

In the classification model obtaining step S104, a classification model which has been trained is obtained by minimizing a loss function comprising the rebuild loss and the inter-class loss.

As an example, in the classification model obtaining step S104, setting the loss function L to comprise the rebuild loss Lvae and the inter-class loss Ls, the loss function L may be represented as follows:

$$L = Lvae + \lambda Ls \quad (5)$$

In the expression (5), $\lambda$ is a meta parameter. Those skilled in the art can determine $\lambda$ in advance according to experience.

With respect to all samples in the training set, by minimizing the loss function L, it is possible to determine parameters in the classification model, that is, it is possible to obtain a classification model which has been trained.

The method 100 for training a classification model according to the embodiment of the present disclosure ends at S105.

As can be seen from the above, in the method 100 for training a classification model according to the embodiment of the present disclosure, it is possible to accelerate training on the classification model by representing the sample using a low dimensional hidden feature; moreover, since the loss function comprises an inter-class loss helpful for increasing a difference between different classes, the classification model which has been trained can perform classification on to-be-tested information more precisely.

Preferably, the method 100 for training a classification model according to the embodiment of the present disclosure may further comprise a center loss calculating step for calculating a center loss indicating a distance between a hidden feature of each sample and a center hidden feature of a class to which the sample belongs, wherein the loss function further comprises the center loss.

As an example, to make a difference between hidden features belonging to the same class small, i.e., to make features from the same class more aggregative, the center loss Lc is calculated in the center loss calculating step as follows:

$$Lc = \frac{1}{2}\sum_{i=1}^{N}\|z_i - c_{y_i}\| \quad (6)$$

In the expression (6), $z_i$ is a hidden feature of an i-th sample, and $c_{y_i}$ is a center vector of hidden features of a $y_i$-th class to which $z_i$ belongs, where i=1, 2, . . . , N.

After the center loss is calculated, the loss function L comprising the center loss Lc may be calculated as follows:

$$L = Lvae + \lambda_1 Lc + \lambda_2 Ls \quad (7)$$

In the expression (7), $\lambda_1$ and $\lambda_2$ are meta parameters. Those skilled in the art can determine $\lambda_1$ and $\lambda_2$ in advance according to experience.

With respect to all samples in the training set, by minimizing the loss function L in the expression (7), it is possible to determine parameters in the classification model, that is, it is possible to obtain a classification model which has been trained.

Figure 2A:
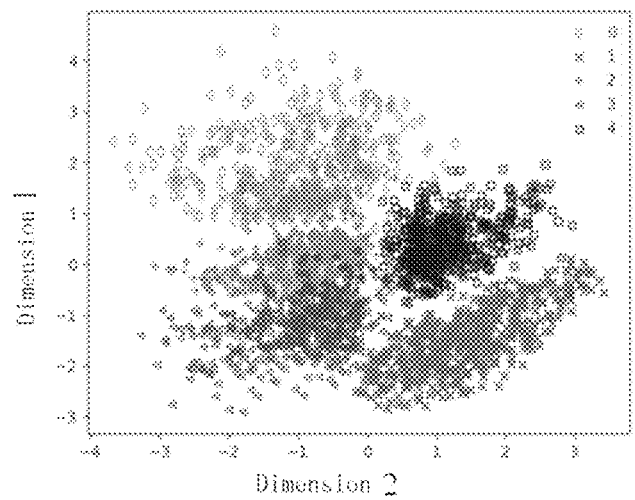
FIGS. 2A and 2B schematically show distribution maps of hidden features belonging to different classes in cases where a loss function comprises a center loss and an inter-class loss and where the loss function does not comprise the center loss and the inter-class loss.
Figure 2B:
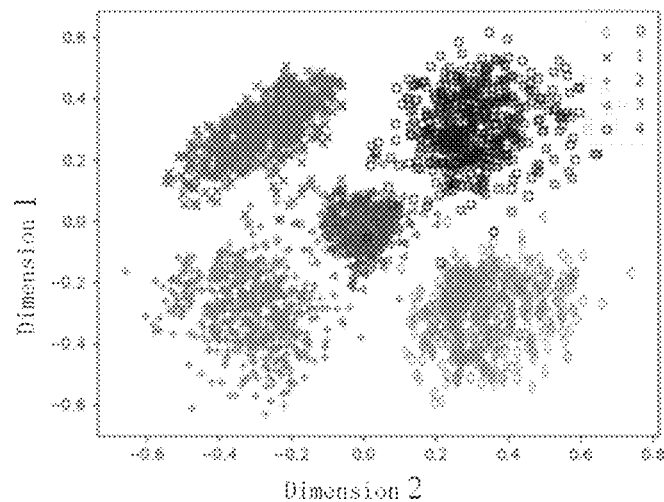

FIGS. 2A and 2B schematically show distribution maps of hidden features belonging to different classes in cases where a loss function comprises a center loss and an inter-class loss and where the loss function does not comprise the center loss and the inter-class loss, respectively. In FIGS. 2A and 2B, to simply and clearly show the distribution maps of the hidden features, it is assumed that the hidden features are two-dimensional vectors with dimension 1 and dimension 2.

FIG. 2A shows the distribution map of the hidden features in the case where the loss function L does not comprise the center loss Lc and the inter-class loss Ls; and FIG. 2B shows the distribution map of the hidden features in the case where the loss function L comprises the center loss Lc and the inter-class loss Ls. As can be seen from FIGS. 2A and 2B, in comparison with the case where the loss function L does not comprise the center loss Lc and the inter-class loss Ls, in the case where the loss function L comprises the center loss Lc and the inter-class loss Ls, hidden features belonging to the same class are more aggregative, and hidden features belonging to different classes are more separate.

As can be seen from the above, in the method 100 for training a classification model according to the embodiment of the present disclosure, since the loss function may further comprise the center loss in addition to the inter-class loss, it is possible to decrease an intra-class difference while increasing a difference between different classes, and therefore, the classification model which has been trained can perform classification on to-be-tested information more precisely.

In correspondence to the above embodiment of the method for training a classification model, the present disclosure further provides the following embodiment of an apparatus for training a classification model.

Figure 3:
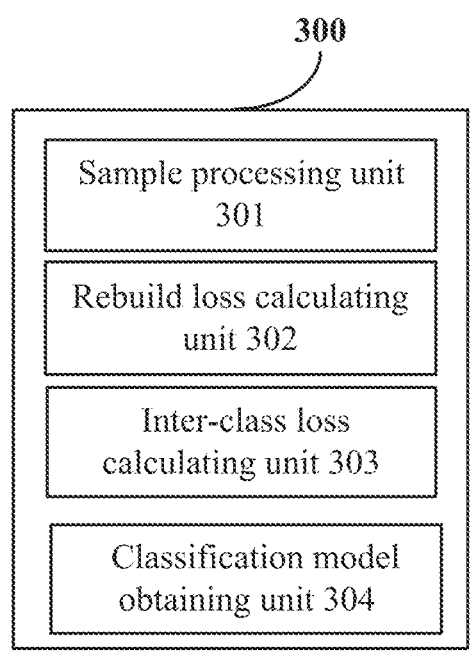
FIG. 3 is a block diagram showing a functional configuration example of an apparatus for training a classification model according to an embodiment of the present disclosure.

FIG. 3 is a block diagram showing a functional configuration example of an apparatus 300 for training a classification model according to the embodiment of the present disclosure.

As shown in FIG. 3, the apparatus 300 for training a classification model according to the embodiment of the present disclosure may comprise a sample processing unit 301, a rebuild loss calculating unit 302, an inter-class loss calculating unit 303 and a classification model obtaining unit 304. Next, functional configuration examples of the sample processing unit 301, the rebuild loss calculating unit 302, the inter-class loss calculating unit 303 and the classification model obtaining unit 304 will be described.

In the sample processing unit 301, it is possible to perform the following processing with respect to each sample in a training set respectively: extracting a feature from the sample; compressing the extracted feature into a low dimensional hidden feature capable of representing the sample: performing decompression on the hidden feature to obtain a decompressed feature; and performing rebuilding on the sample based on the decompressed feature, to obtain a reconstructed sample.

For specific examples of the processing performed on each sample in the training set, reference may be made to the description of the corresponding portions (e.g. the sample processing step S101 in FIG. 1) in the above method embodiment, and no repeated description will be made herein.

In the rebuild loss calculating unit 302, it is possible to calculate a rebuild loss with respect to all samples in the training set based on the hidden features.

Preferably, the rebuild loss may comprise a generation loss indicating a difference between each sample and its reconstructed sample and a latent loss indicating a matching degree between a distribution of the hidden feature and a specific distribution.

As an example, the generation loss may measure an accuracy degree of the reconstruction process, and the latent loss may measure a matching degree between the hidden feature and the specific distribution.

For specific examples of the rebuild loss, reference may be made to the description of the corresponding portions (e.g., the rebuild loss calculating step S102 in FIG. 1) in the above method embodiment, and no repeated description will be made herein.

In the inter-class loss calculating unit 303, an inter-class loss indicating a separation degree between samples of different classes is calculated with respect to all samples in the training set.

Preferably, in the inter-class loss calculating unit 303, it is possible to calculate a softmax loss as the inter-class loss based on a hidden feature of each sample.

For specific examples of the inter-class loss, reference may be made to the description of the corresponding portions (e.g., the inter-class loss calculating step S103 in FIG. 1) in the above method embodiment, and no repeated description will be made herein.

In the classification model obtaining unit 304, a classification model which has been trained is obtained by minimizing a loss function comprising the rebuild loss and the inter-class loss.

With respect to all samples in the training set, by minimizing a loss function comprising the rebuild loss and the inter-class loss, it is possible to determine parameters in the classification model, that is, it is possible to obtain a classification model which has been trained.

As can be seen from the above, in the apparatus 300 for training a classification model according to the embodiment of the present disclosure, it is possible to accelerate training on the classification model by representing the sample using a low dimensional hidden feature; moreover, since the loss function comprises the inter-class loss helpful for increasing a difference between different classes, the classification model which has been trained can perform classification on to-be-tested information more precisely.

Preferably, the apparatus 300 for training a classification model according to the embodiment of the present disclosure may further comprise a center loss calculating unit for calculating a center loss indicating a distance between a hidden feature of each sample and a center hidden feature of a class to which the sample belongs, wherein the loss function further comprises the center loss For specific examples of the center loss, reference may be made to the description of the corresponding portions (e.g., the center loss calculating step) in the above method embodiment, and no repeated description will be made herein.

As can be seen from the above, in the apparatus 300 for training a classification model according to the embodiment of the present disclosure, since the loss function may further comprise the center loss in addition to the inter-class loss, it is possible to decrease an intra-class difference while increasing a difference between different classes, and therefore, the classification model which has been trained can perform classification on to-be-tested information more precisely.

It should be noted that, although the functional configuration of the apparatus for training a classification model according to the embodiment of the present disclosure has been described above, this is only exemplary but not limiting, and those skilled in the art can carry out modifications on the above embodiment according to the principle of the disclosure, for example can perform additions, deletions or combinations or the like on the respective functional modules in the embodiment. Moreover, all such modifications fall within the scope of the present disclosure.

In addition, it should also be noted that the apparatus embodiment herein corresponds to the above method embodiment. Thus for contents not described in detail in the apparatus embodiment, reference may be made to the description in the corresponding portions in the method embodiment, and no repeated description will be made herein.

In addition, the present disclosure further provides a storage medium and a program product. Machine executable instructions in the storage medium and the program product according to embodiments of the present disclosure can be configured to implement the above method for training a classification model. Thus for contents not described in detail herein, reference may be made to the description of the preceding corresponding portions, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

According to another aspect of the present disclosure, there is provided a method 400 for classifying. The method 400 for classifying according to the embodiment of the present disclosure is a method for open set recognition, and the method is applicable for classifying known classes and detecting unknown classes, thus making it possible to discriminate unknown classes precisely while ensuring correct classification on known classes.

Figure 4:
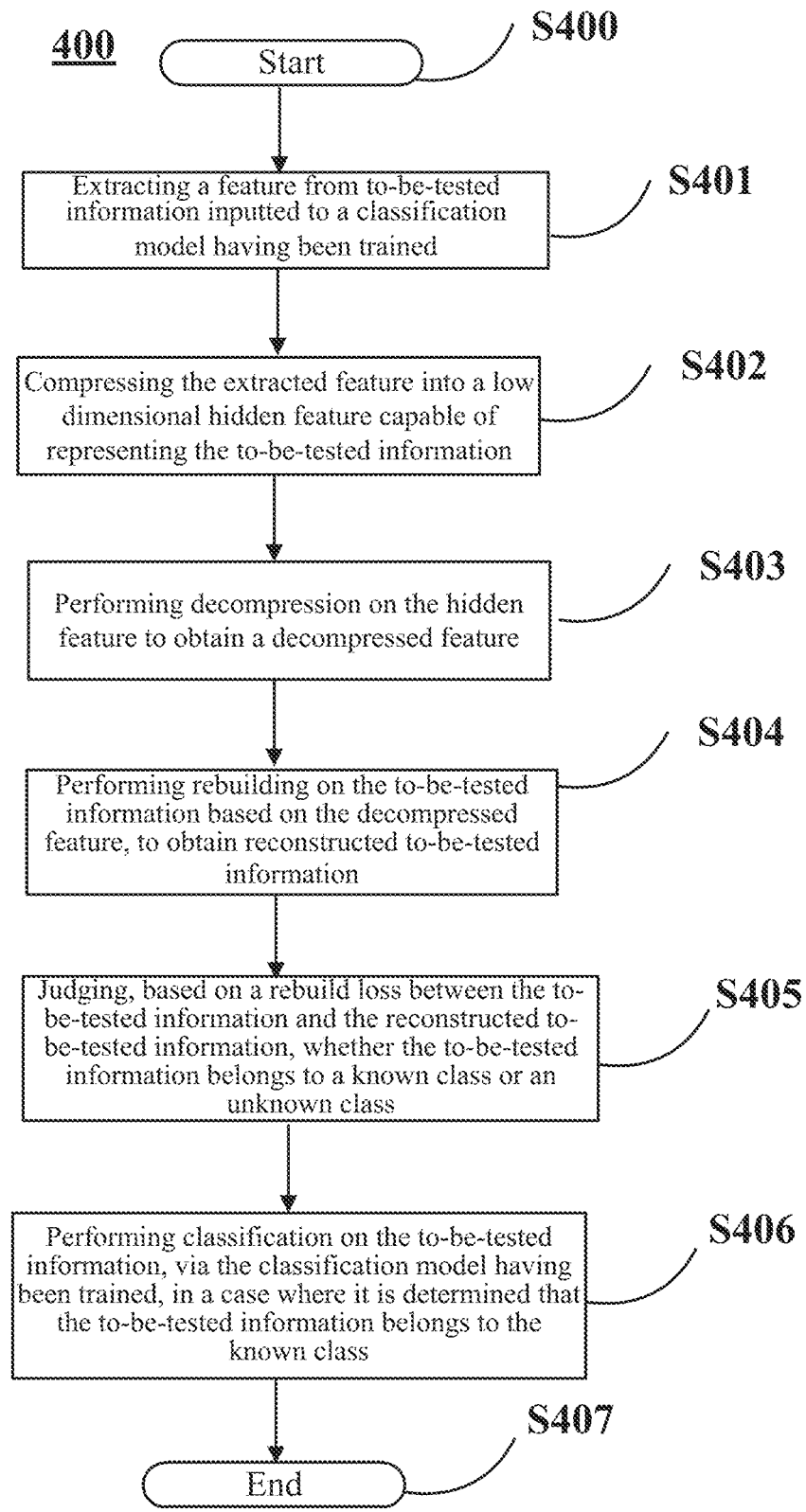
FIG. 4 is a flowchart showing a flow example of a method for classifying according to an embodiment of the present disclosure.

A flow example of the method 400 for classifying according to the embodiment of the present disclosure will be described with reference to FIG. 4. FIG. 4 is a flowchart showing a flow example of the method 400 for classifying according to the embodiment of the present disclosure. As shown in FIG. 4, the method 400 for classifying according to the embodiment of the present disclosure comprises an extracting step S401, a compressing step S402, a decompressing step S403, a reconstructing step S404, a judging step S405 and a classifying step S406.

The method 400 for classifying according to the embodiment of the present disclosure starts at S400.

In the extracting step S401, it is possible to extract a feature from to-be-tested information inputted to a classification model having been trained.

As an example, the to-be-tested information may be text or other common pictures. It is assumed to represent the to-be-tested information by x. It is possible to extract a feature of the to-be-tested information x using a convolution layer while considering spatial correlation information among pixels, and the extracted feature is generally a high dimensional feature. Therefore, for example, in the method 400 for classifying according to the embodiment of the present disclosure, it is possible to extract a feature of the to-be-tested information while considering spatial correlation information among pixels.

In the compressing step S402, it is possible to compress the extracted feature into a low dimensional hidden feature z capable of representing the to-be-tested information. It is possible to accelerate a classification speed by representing the to-be-tested information using a low dimensional hidden feature.

In the decompressing step S403, it is possible to perform decompression on the hidden feature z to obtain a decompressed feature.

In the reconstructing step S404, it is possible to perform rebuilding on the to-be-tested information x based on the decompressed feature, to obtain a reconstructed to-be-tested information x'.

It should be noted herein that, to facilitate description, x, x' and z are used in both the method 100 for training a classification model according to the embodiment of the present disclosure and the method 400 for classifying according to the embodiment of the present disclosure, whereas the objects represented by x, x' and z in the method 100 for training a classification model and in the method 400 for classifying are different. Taking x as an example, in the method 100 for training a classification model, x represents the sample, whereas in the method 400 for classifying, x represents the to-be-test information.

In the judging step S405, it is possible to judge, based on a rebuild loss between the to-be-tested information x and the reconstructed to-be-tested information x, whether the to-be-tested information belongs to a known class or an unknown class.

Figures 5A, 5B, 6:
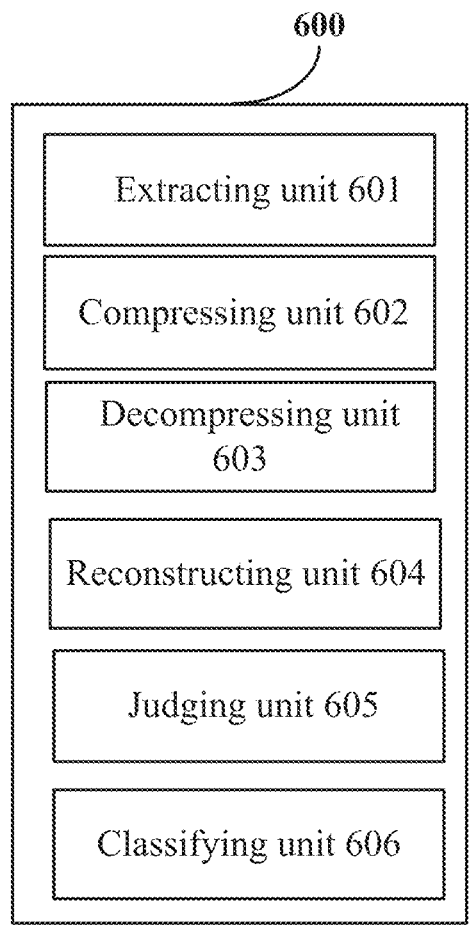
FIGS. 5A and 5B are exemplary diagrams showing performing rebuilding based on hidden features utilizing a variational autoencoder.
FIG. 6 is a block diagram showing a functional configuration example of an apparatus for classifying according to an embodiment of the present disclosure.

As an example but not a limitation, it is possible to perform rebuilding on hidden features utilizing a Variational Autoencoder (VAE). FIGS. 5A and 5B are exemplary diagrams showing performing rebuilding based on hidden features utilizing a variational autoencoder. In FIGS. 5A and 5B, illustrations of rebuilding with hidden features of size 5 are shown, wherein digits 0-4 are known classes, and digits 5-9 are unknown classes. FIG. 5A is an input, and FIG. 5B is a reconstructed output. As can be seen from FIGS. 5A and 5B, with respect to the known classes (digits 0-4), their rebuild losses are smaller, and therefore the VAE model can better perform rebuilding on the known classes: while with respect to the unknown classes (digits 5-9), their rebuild losses are larger, and therefore their reconstruction effects are not ideal.

That is, in the method 400 for classifying according to the embodiment of the present disclosure, it is possible to judge, based on a rebuild loss, whether the to-be-tested information belongs to a known class or an unknown class.

According to the embodiment of the present disclosure, by separating data of known classes from data of unknown classes, it is possible to discriminate unknown classes more precisely while ensuring correct classification on known classes.

Preferably, the rebuild loss may comprise a generation loss indicating a difference between the to-be-tested information and the reconstructed to-be-tested information and a latent loss indicating a matching degree between a distribution of the hidden feature and a specific distribution.

As an example, the generation loss may measure an accuracy degree of the reconstruction process, and the latent loss may measure a matching degree between the hidden feature and the specific distribution.

Wherein, the generation loss $Lg\_1$ may be represented as follows:

$$Lg\_1 = \|x - x'\|_2 \tag{8}$$

Assuming that the specific distribution is a unit Gaussian distribution $N(0,1)$, i.e., assuming that the hidden feature z substantially follows a unit Gaussian distribution, the latent loss may be represented as follows:

$$Ll\_1 = KL(p(z|x), N(0,1)) \tag{9}$$

In the expression (9), $p(z|x)$ is a posterior distribution $P(z|x)$ of the hidden feature z given the to-be-tested information x, $N(0,1)$ is a probability density function of a unit Gaussian distribution, and $KL(\ )$ represents a KL distance.

The rebuild loss Lvae_1 may be represented as follows:

$$Lvae\_1 = Lg\_1 + Ll\_1 \quad (10)$$

Preferably, in the judging step S405, in a case where the rebuild loss is less than or equal to a predetermined threshold, it is judged that the to-be-tested information belongs to a known class, and in a case where the rebuild loss is greater than the predetermined threshold, it is judged that the to-be-tested information belongs to an unknown class. It should be mentioned that, the latent loss described above is helpful for detecting unknown classes.

As an example but not a limitation, the predetermined threshold may be determined according to experience.

In the classifying step S406, it is possible to perform classification on the to-be-tested information, via the classification model having been trained, in a case where it is determined that the to-be-tested information belongs to a known class.

As an example, in the classifying step S406, classification is performed on the to-be-tested information only in a case where it is determined that the to-be-tested information belongs to a known class.

Preferably, in the classification model, a softmax loss is used to indicate a separation degree between different known classes: in the classifying step S406, the softmax loss is calculated using the hidden feature based on each of known classes; and a loss function of the to-be-tested information comprises the rebuild loss and the softmax loss.

As an example, to make a difference between different classes as large as possible. i.e., to separate features of different classes as far as possible, in the classification model, a softmax loss is used to indicate a separation degree between different known classes.

In the classifying step S406, the softmax loss is calculated using the hidden feature based on each of known classes as follows:

$$Ls\_1 = -\frac{e^{W_y z + b_y}}{\sum_{j=1}^{m} e^{W_j z + b_j}} \quad (11)$$

In the expression (11), m is the number of known classes, $W_j$ and $b_j$ represent classification model parameters corresponding to a class y to which the hidden feature z belongs, respectively, and $W_j$ and $b_j$ (j=1, 2, . . . , m) represent classification model parameters corresponding to a j-th class among the m known classes.

Besides the softmax loss, those skilled in the art can also readily envisage other calculation manners of the inter-class loss, which will not be repeatedly described herein.

The loss function of the to-be-tested information obtained via the classification model having been trained may be represented as follows:

$$L\_1 = Lvae\_1 + \lambda Ls\_1 \quad (12)$$

In the expression (12), $\lambda$ is a meta parameter of the classification model having been trained. Those skilled in the art can determine $\lambda$ in advance according to experience.

In the classifying step S406, it is possible to perform classification on the to-be-tested information according to a loss function of the to-be-tested information which comprises the rebuild loss and the softmax loss.

The method 400 for classifying according to the embodiment of the present disclosure ends at S407.

As can be seen from the above, in the method 400 for classifying according to the embodiment of the present disclosure, it is possible to accelerate a classification speed by representing the to-be-tested information using a low dimensional hidden feature: since classification is performed only on the to-be-tested information belonging to a known class and the loss function of the classification model comprises an inter-class loss helpful for increasing a difference between different classes, it is possible to perform classification on the to-be-tested information more precisely; this method is a method for open set recognition, and the method is applicable for classifying known classes and detecting unknown classes, separating data of known classes from data of unknown classes, thus making it possible to discriminate unknown classes precisely while ensuring correct classification on known classes.

Preferably, in the classifying step S406, it is possible to further calculate a center loss indicating a distance between the hidden feature and a center hidden feature of each of known classes, and the loss function may further comprise the center loss.

As an example, to make a difference between hidden features belonging to the same class small, i.e., to make features from the same class more aggregative, the center loss is further calculated in the classification model.

In the classifying step S406, the center loss indicating the distance between the hidden feature and the center hidden feature of each of known classes may be represented as follows:

$$Lc\_1 = \frac{1}{2}\|z - c_j\| \quad (13)$$

In the expression (13), $c_j$ is a center vector of a hidden feature of a j (j=1, 2, . . . , m) known class.

Accordingly, the above loss function may further comprise the center loss. The loss function comprising the center loss Lc_1 may be represented as follows:

$$L\_1 = Lvae\_1 + \lambda_1 Lc\_1 + \lambda_2 Ls\_1 \quad (14)$$

In the expression (14), $\lambda_1$ and $\lambda_2$ are meta parameters of the classification model which has been trained. Those skilled in the art can determine $\lambda_1$ and $\lambda_2$ in advance according to experience.

In the classifying step S406, it is possible to perform classification on the to-be-tested information according to a loss function comprising the center loss in addition to the rebuild loss and the softmax loss.

As can be seen from the above, in the method 400 for classifying according to the embodiment of the present disclosure, since the loss function may further comprise the center loss in addition to the inter-class loss, it is possible to perform classification on the to-be-tested information more precisely.

Experimental examples of the method 100 for training a classification model according to the embodiment of the present disclosure and the method 400 for classifying according to the embodiment of the present disclosure will be simply introduced below.

We use the classic Mnist dataset as experimental data, which contains 10 classes from label 0 to label 9. 6 classes are randomly chosen each with 4000 instances as a training set and 200 instances as a testing set. In order to test performance under different openness, we alter the openness of the testing data by incorporating a different number of unknown classes each with 200 samples. Thus, the total training set contains 24000 instances, and the instance number of the testing set varies from 1200 to 2000.

Several evaluation criteria including openness Openness, recall Recall, precision Precision, F1 Score and accuracy Accuracy are defined as follows:

$$Openness = 1 - \sqrt{\frac{2 \times N_{TA}}{N_{TG} + N_{TZ}}}$$

$$Recall = \frac{TP}{TP + FN}$$

$$Precision = \frac{TP}{TP + FP}$$

$$F1 = \frac{2 \cdot Precision \cdot Recall}{Precision + Recall}$$

$$Accuracy = \frac{TP + TN}{TN + TP + FP + FN}$$

In the above expressions, $N_{TA}$, $N_{TG}$, $N_{TE}$ represent the number of classes for the training set, classifying and the testing set respectively. TP, FN, FP and TN represent true positive, false negative, false positive and true negative respectively.

To evaluate the effect of the method 400 for classifying according to the embodiment of the present disclosure, we calculate F1 score and accuracy under different openness, and compare experimental results with the Sparse Representation-based Open Set Recognition (SROSR) algorithm in the prior art. In the SROSR algorithm, not all classes appearing during testing are known in the training process. The SROSR algorithm use class reconstruction errors for classification. We set $\lambda_1=0.1$, $\lambda_2=0.8$, and hidden feature dimension as 10 in the training process. The testing results are presented in Table 1.

TABLE 1

| Openness | 0% | | 3.92% | | 7.42% | | 10.56% | | 13.41% | |
| --- | --- | --- | --- | --- | --- | --- | --- | --- | --- | --- |
|  | F1 | Accuracy | F1 | Accuracy | F1 | Accuracy | F1 | Accuracy | F1 | Accuracy |
| Method 400 for classifying | 0.9950 | 0.9903 | 0.9654 | 0.9407 | 0.9539 | 0.9319 | 0.9429 | 0.9250 | 0.9384 | 0.9275 |
| SROSR | 0.9929 | 0.9858 | 0.9513 | 0.9171 | 0.9453 | 0.9187 | 0.9305 | 0.9222 | 0.9257 | 0.9245 |

As can be seen from Table 1, the method 400 for classifying according to the embodiment of the present disclosure gains better performance. Besides, since the SROSR trains one network at a time, the whole training process is quite time-consuming and taxing. For instance, for the above experimental setting, it will take 2 days to complete the training of the whole model. However, for the method 100 for training a classification model according to the embodiment of the present disclosure, less than an hour is adequate for the whole training process.

In correspondence to the above embodiment of the method for classifying, the present disclosure further provides the following embodiment of an apparatus 600 for classifying.

FIG. 6 is a block diagram showing a functional configuration example of the apparatus 600 for classifying according to the embodiment of the present disclosure.

As shown in FIG. 6, the apparatus 600 for classifying according to the embodiment of the present disclosure comprises an extracting unit 601, a compressing unit 602, a decompressing unit 603, a reconstructing unit 604, a judging unit 605 and a classifying unit 606. Next, functional configuration examples of the extracting unit 601, the compressing unit 602, the decompressing unit 603, the reconstructing unit 604, the judging unit 605 and the classifying unit 606 will be described.

In the extracting unit 601, it is possible to extract a feature from to-be-tested information inputted to a classification model having been trained.

As an example, the to-be-tested information may be text or other common pictures. It is assumed to represent the to-be-tested information by x. For example, it is possible to extract a feature of the to-be-tested information x using a convolution layer while considering spatial correlation information among pixels, and the extracted feature is generally a high dimensional feature. Therefore, for example, in the apparatus 600 for classifying according to the embodiment of the present disclosure, it is possible to extract a feature of the to-be-tested information while considering spatial correlation information among pixels.

In the compressing unit 602, it is possible to compress the extracted feature into a low dimensional hidden feature z capable of representing the to-be-tested information. It is possible to accelerate a classification speed by representing the to-be-tested information using a low dimensional hidden feature.

In the decompressing unit 603, it is possible to perform decompression on the hidden feature z to obtain a decompressed feature.

In the reconstructing unit 604, it is possible to perform rebuilding on the to-be-tested information x based on the decompressed feature, to obtain a reconstructed to-be-tested information x'.

In the judging unit 605, it is possible to judge, based on a rebuild loss between the to-be-tested information x and the reconstructed to-be-tested information x', whether the to-be-tested information belongs to a known class or an unknown class.

By separating data of known classes from data of unknown classes, it is possible to discriminate unknown classes more precisely while ensuring correct classification on known classes.

Preferably, the rebuild loss may comprise a generation loss indicating a difference between the to-be-tested information and the reconstructed to-be-tested information and a latent loss indicating a matching degree between a distribution of the hidden feature and a specific distribution.

As an example, the generation loss may measure an accuracy degree of the reconstruction process, and the latent loss may measure a matching degree between the hidden feature and the specific distribution.

For description of the rebuild loss, reference may be made to the description of the corresponding portions (e.g. the judging step S405 in FIG. 4) in the above method embodiment of the method 400 for classifying, and no repeated description will be made herein.

Preferably, in the judging unit 605, in a case where the rebuild loss is less than or equal to a predetermined threshold, it is judged that the to-be-tested information belongs to a known class, and in a case where the rebuild loss is greater than the predetermined threshold, it is judged that the to-be-tested information belongs to an unknown class.

As an example but not a limitation, the predetermined threshold may be determined according to experience.

In the classifying unit 606, it is possible to perform classification on the to-be-tested information, via the classification model having been trained, in a case where it is determined that the to-be-tested information belongs to a known class.

As an example, in the classifying unit 606, classification is performed on the to-be-tested information only in a case where it is determined that the to-be-tested information belongs to a known class.

Preferably, in the classification model, a softmax loss is used to indicate a separation degree between different known classes; in the classifying unit 606, the softmax loss is calculated using the hidden feature based on each of known classes; and a loss function of the to-be-tested information comprises the rebuild loss and the softmax loss.

As an example, to make a difference between different classes as large as possible, i.e., to separate features of different classes as far as possible, in the classification model, a softmax loss is used to indicate a separation degree between different known classes.

For description of the softmax loss, reference may be made to the description of the corresponding portions (e.g. the classifying step S406 in FIG. 4) in the above method embodiment of the method 400 for classifying, and no repeated description will be made herein.

In the classifying unit 606, it is possible to perform classification on the to-be-tested information according to a loss function of the to-be-tested information which comprises the rebuild loss and the softmax loss.

As can be seen from the above, in the apparatus 600 for classifying according to the embodiment of the present disclosure, it is possible to accelerate a classification speed by representing the to-be-tested information using a low dimensional hidden feature; since classification is performed only on the to-be-tested information belonging to a known class and the loss function of the classification model comprises an inter-class loss helpful for increasing a difference between different classes, it is possible to perform classification on the to-be-tested information more precisely; moreover, this apparatus is applicable for classifying known classes and detecting unknown classes, separating data of known classes from data of unknown classes, thus making it possible to discriminate unknown classes precisely while ensuring correct classification on known classes.

Preferably, in the classifying unit 606, it is possible to further calculate a center loss indicating a distance between the hidden feature and a center hidden feature of each of known classes, and the loss function may further comprise the center loss.

As an example, to make a difference between hidden features belonging to the same class small, i.e., to make features from the same class more aggregative, the center loss is further calculated in the classification model.

For description of the center loss, reference may be made to the description of the corresponding portions (e.g. the classifying step S406 in FIG. 4) in the above method embodiment of the method 400 for classifying, and no repeated description will be made herein.

In the classifying unit 606, it is possible to perform classification on the to-be-tested information according to a loss function comprising the center loss in addition to the rebuild loss and the softmax loss.

As can be seen from the above, in the apparatus 600 for classifying according to the embodiment of the present disclosure, since the loss function may further comprise the center loss in addition to the inter-class loss, it is possible to perform classification on the to-be-tested information more precisely.

It should be noted that, although the functional configuration of the apparatus for classifying according to the embodiment of the present disclosure has been described above, this is only exemplary but not limiting, and those skilled in the art can carry out modifications on the above embodiment according to the principle of the disclosure, for example can perform additions, deletions or combinations or the like on the respective functional modules in the embodiment. Moreover, all such modifications fall within the scope of the present disclosure.

In addition, it should also be noted that the apparatus embodiment herein corresponds to the above method embodiment. Thus for contents not described in detail in the apparatus embodiment, reference may be made to the description in the corresponding portions in the method embodiment, and no repeated description will be made herein.

In addition, the present disclosure further provides a storage medium and a program product. Machine executable instructions in the storage medium and the program product according to embodiments of the present disclosure can be configured to implement the above method for classifying. Thus for contents not described in detail herein, reference may be made to the description of the preceding corresponding portions, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

Figure 7:
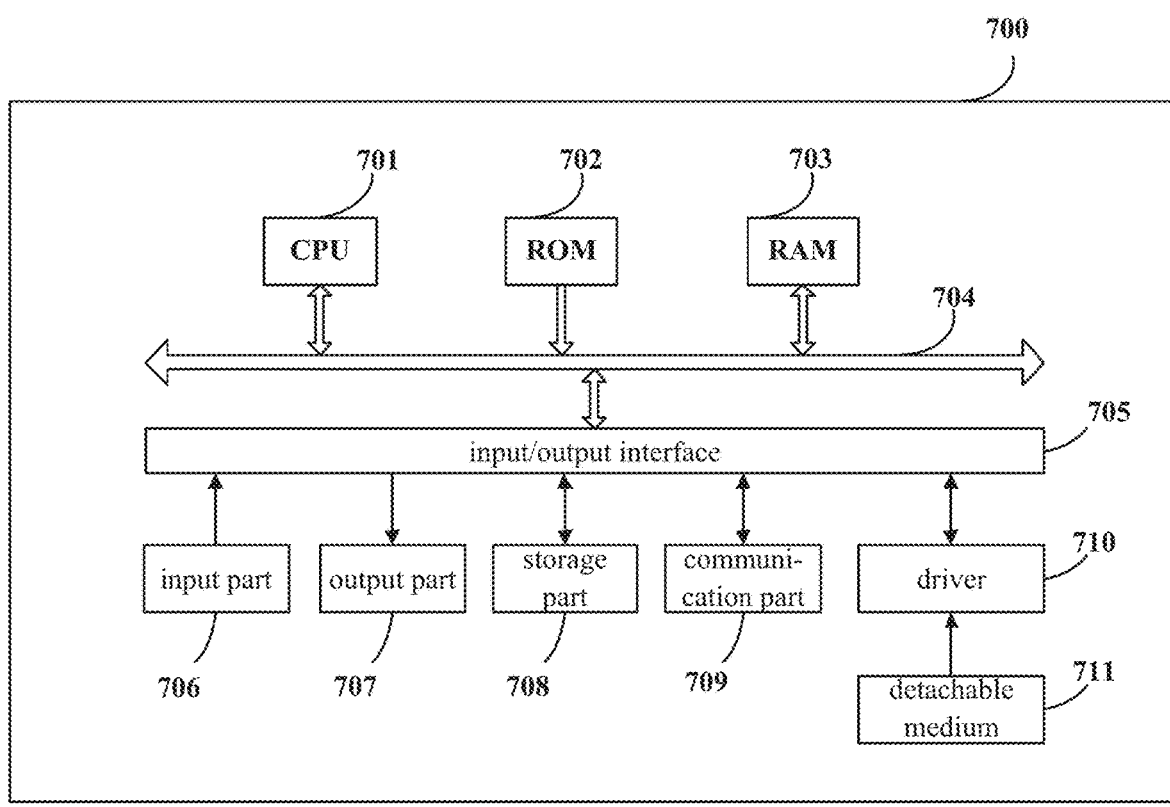
FIG. 7 is a block diagram showing an exemplary structure of a personal computer that can be used in an embodiment of the present disclosure.

In addition, it should also be noted that, the foregoing series of processing and apparatuses can also be implemented by software and/or firmware. In the case of implementation by software and/or firmware, programs constituting the software are installed from a storage medium or a network to a computer having a dedicated hardware structure, for example the universal personal computer 700 as shown in FIG. 7. The computer, when installed with various programs, can execute various functions and the like.

In FIG. 7, a Central Processing Unit (CPU) 701 executes various processing according to programs stored in a Read-Only Memory (ROM) 702 or programs loaded from a storage part 708 to a Random Access Memory (RAM) 703. In the RAM 703, data needed when the CPU 701 executes various processing and the like is also stored, as needed.

The CPU 701, the ROM 702 and the RAM 703 are connected to each other via a bus 704. An input/output interface 705 is also connected to the bus 704.

The following components are connected to the input/output interface 705: an input part 706, including a keyboard, a mouse and the like; an output part 707, including a display, such as a Cathode Ray Tube (CRT), a Liquid Crystal Display (LCD) and the like, as well as a speaker and the like; the storage part 708, including a hard disc and the like: and a communication part 709, including a network interface card such as an LAN card, a modem and the like. The communication part 709 executes communication processing via a network such as the Internet.

As needed, a driver 710 is also connected to the input/output interface 705. A detachable medium 711 such as a magnetic disc, an optical disc, a magnetic optical disc, a semiconductor memory and the like is installed on the driver 710 as needed, such that computer programs read therefrom are installed in the storage part 708 as needed.

In a case where the foregoing series of processing is implemented by software, programs constituting the software are installed from a network such as the Internet or a storage medium such as the detachable medium 711.

Those skilled in the art should appreciate that, such a storage medium is not limited to the detachable medium 711 in which programs are stored and which are distributed separately from an apparatus to provide the programs to users as shown in FIG. 7. Examples of the detachable medium 711 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be hard discs included in the ROM 702 and the memory part 708, in which programs are stored and which are distributed together with the apparatus containing them to users.

Preferred embodiments of the present disclosure have been described above with reference to the drawings. However, the present disclosure of course is not limited to the above examples. Those skilled in the art can obtain various alterations and modifications within the scope of the appended claims, and it should be understood that these alterations and modifications naturally will fall within the technical scope of the present disclosure.

For example, in the above embodiments, a plurality of functions incorporated in one unit can be implemented by separate devices. Alternatively, in the above embodiments, a plurality of functions implemented by a plurality of units can be implemented by separate devices, respectively. In addition, one of the above functions can be implemented by a plurality of units. Undoubtedly, such configuration is included within the technical scope of the present disclosure.

In the specification, the steps described in the flowcharts not only include processing executed in the order according to a time sequence, but also include processing executed in parallel or separately but not necessarily according to a time sequence. Moreover, even in the steps of the processing according to a time sequence, it is of course still possible to appropriately change the order.

In addition, the following configurations can also be performed according to the technology of the present disclosure.

Appendix 1. A method for training a classification model, comprising:

a sample processing step of performing the following processing with respect to each sample in a training set respectively:

extracting a feature from the sample;

compressing the extracted feature into a low dimensional hidden feature capable of representing the sample;

performing decompression on the hidden feature to obtain a decompressed feature: and performing rebuilding on the sample based on the decompressed feature, to obtain a reconstructed sample;

a rebuild loss calculating step of calculating a rebuild loss with respect to all samples in the training set based on the hidden features;

an inter-class loss calculating step of calculating, with respect to all samples in the training set, an inter-class loss indicating a separation degree between samples of different classes; and a classification model obtaining step of obtaining, by minimizing a loss function comprising the rebuild loss and the inter-class loss, a classification model which has been trained.

Appendix 2. The method for training a classification model according to Appendix 1, wherein the rebuild loss comprises a generation loss indicating a difference between each sample and its reconstructed sample and a latent loss indicating a matching degree between a distribution of the hidden feature and a specific distribution, Appendix 3. The method for training a classification model according to Appendix 1, wherein in the inter-class loss calculating step, a softmax loss is calculated as the inter-class loss based on the hidden feature of each sample.

Appendix 4. The method for training a classification model according to Appendix 2, wherein in the inter-class loss calculating step, a softmax loss is calculated as the inter-class loss based on the hidden feature of each sample.

Appendix 5. The method for training a classification model according to Appendix 1, further comprising:

a center loss calculating step of calculating a center loss indicating a distance between the hidden feature of each sample and a center hidden feature of a class to which the sample belongs, wherein the loss function further comprises the center loss.

Appendix 6. The method for training a classification model according to Appendix 2, further comprising:

a center loss calculating step of calculating a center loss indicating a distance between the hidden feature of each sample and a center hidden feature of a class to which the sample belongs, wherein the loss function further comprises the center loss.

Appendix 7. The method for training a classification model according to Appendix 3, further comprising:

a center loss calculating step of calculating a center loss indicating a distance between the hidden feature of each sample and a center hidden feature of a class to which the sample belongs, wherein the loss function further comprises the center loss.

Appendix 8. A method for classifying, comprising:

an extracting step of extracting a feature from to-be-tested information inputted to a classification model having been trained;

a compressing step of compressing the extracted feature into a low dimensional hidden feature capable of representing the to-be-tested information;

a decompressing step of performing decompression on the hidden feature to obtain a decompressed feature;

a reconstructing step of performing rebuilding on the to-be-tested information based on the decompressed feature, to obtain reconstructed to-be-tested information;

a judging step of judging, based on a rebuild loss between the to-be-tested information and the reconstructed to-be-tested information, whether the to-be-tested information belongs to a known class or an unknown class; and a classifying step of performing classification on the to-be-tested information, via the classification model having been trained, in a case where it is determined that the to-be-tested information belongs to the known class.

Appendix 9. The method for classifying according to Appendix 8, wherein in the judging step, in a case where the rebuild loss is less than or equal to a predetermined threshold, it is judged that the to-be-tested information belongs to the known class, and in a case where the rebuild loss is greater than the predetermined threshold, it is judged that the to-be-tested information belongs to the unknown class.

Appendix 10. The method for classifying according to Appendix 8, wherein the rebuild loss comprises a generation loss indicating a difference between the to-be-tested information and the reconstructed to-be-tested information and a latent loss indicating a matching degree between a distribution of the hidden feature and a specific distribution.

Appendix 11. The method for classifying according to Appendix 8, wherein in the classification model, a softmax loss is used to indicate a separation degree between different classes; and in the classifying step, the softmax loss is calculated using the hidden feature based on each of known classes, and a loss function of the to-be-tested information comprises the rebuild loss and the softmax loss.

Appendix 12. The method for classifying according to Appendix 10, wherein in the classification model, a softmax loss is used to indicate a separation degree between different known classes; and in the classifying step, the softmax loss is calculated using the hidden feature based on each of known classes, and a loss function of the to-be-tested information comprises the rebuild loss and the softmax loss.

Appendix 13. The method for classifying according to Appendix 11, wherein in the classifying step, a center loss indicating a distance between the hidden feature and a center hidden feature of each of known classes is further calculated, and the loss function further comprises the center loss.

Appendix 14. The method for classifying according to Appendix 12, wherein in the classifying step, a center loss indicating a distance between the hidden feature and a center hidden feature of each of known classes is further calculated, and the loss function further comprises the center loss.

Appendix 15. An apparatus for classifying, comprising:

an extracting unit configured to extract a feature from to-be-tested information inputted to a classification model having been trained;

a compressing unit configured to compress the extracted feature into a low dimensional hidden feature capable of representing the to-be-tested information;

a decompressing unit configured to perform decompression on the hidden feature to obtain a decompressed feature;

a reconstructing unit configured to perform rebuild on the to-be-tested information based on the decompressed feature, to obtain reconstructed to-be-tested information;

a judging unit configured to judge, based on a rebuild loss between the to-be-tested information and the reconstructed to-be-tested information, whether the to-be-tested information belongs to a known class or an unknown class; and a classifying unit configured to perform classification on the to-be-tested information, via the classification model having been trained, in a case where it is determined that the to-be-tested information belongs to the known class.

Appendix 16. The apparatus for classifying according to Appendix 15, wherein the judging unit is configured to judge that the to-be-tested information belongs to the known class in a case where the rebuild loss is less than or equal to a predetermined threshold, and judge that the to-be-tested information belongs to the unknown class in a case where the rebuild loss is greater than the predetermined threshold.

Appendix 17. The apparatus for classifying according to Appendix 15, wherein the rebuild loss comprises a generation loss indicating a difference between the to-be-tested information and the reconstructed to-be-tested information and a latent loss indicating a matching degree between a distribution of the hidden feature and a specific distribution.

Appendix 18. The apparatus for classifying according to Appendix 15, wherein in the classification model, a softmax loss is used to indicate a separation degree between different known classes: and the classifying unit is configured to calculate the softmax loss using the hidden feature based on each of known classes, and a loss function of the to-be-tested information comprises the rebuild loss and the softmax loss.

Appendix 19. The apparatus for classifying according to Appendix 17, wherein in the classification model, a softmax loss is used to indicate a separation degree between different known classes: and the classifying unit is configured to calculate the softmax loss using the hidden feature based on each of known classes, and a loss function of the to-be-tested information comprises the rebuild loss and the softmax loss.

Appendix 20. The apparatus for classifying according to Appendix 18, wherein the classifying unit is further configured to calculate a center loss indicating a distance between the hidden feature and a center hidden feature of each of known classes, and the loss function further comprises the center loss.

The invention claimed is:

1. A method for training a classification model, comprising:
   a sample processing step of performing the following processing with respect to each sample in a training set respectively:
   extracting a feature from the sample;
   compressing the extracted feature into a low dimensional hidden feature capable of representing the sample;
   performing decompression on the hidden feature to obtain a decompressed feature; and
   performing rebuilding on the sample based on the decompressed feature, to obtain a reconstructed sample;
   a rebuild loss calculating step of calculating a rebuild loss with respect to all samples in the training set based on the hidden feature;
   an inter-class loss calculating step of calculating, with respect to all samples in the training set, an inter-class loss indicating a separation degree between samples of different classes; and
   a classification model obtaining step of obtaining, by minimizing a loss function comprising the rebuild loss and the inter-class loss, a classification model which has been trained.

2. The method for training a classification model according to claim 1, wherein
the rebuild loss comprises a generation loss indicating a difference between each sample and its reconstructed sample and a latent loss indicating a matching degree between a distribution of the hidden feature and a specific distribution.

3. The method for training a classification model according to claim 1, wherein in the inter-class loss calculating step, a softmax loss is calculated as the inter-class loss based on the hidden feature of each sample.

4. The method for training a classification model according to claim 2, wherein in the inter-class loss calculating step, a softmax loss is calculated as the inter-class loss based on the hidden feature of each sample.

5. The method for training a classification model according to claim 1, further comprising:
a center loss calculating step of calculating a center loss indicating a distance between the hidden feature of each sample and a center hidden feature of a class to which the sample belongs,
wherein the loss function further comprises the center loss.

6. The method for training a classification model according to claim 2, further comprising:
a center loss calculating step of calculating a center loss indicating a distance between the hidden feature of each sample and a center hidden feature of a class to which the sample belongs,
wherein the loss function further comprises the center loss.

7. The method for training a classification model according to claim 3, further comprising:
a center loss calculating step of calculating a center loss indicating a distance between the hidden feature of each sample and a center hidden feature of a class to which the sample belongs,
wherein the loss function further comprises the center loss.

8. A method for classifying, comprising:
an extracting step of extracting a feature from to-be-tested information inputted to a classification model having been trained;
a compressing step of compressing the extracted feature into a low dimensional hidden feature capable of representing the to-be-tested information;
a decompressing step of performing decompression on the hidden feature to obtain a decompressed feature;
a reconstructing step of performing rebuilding on the to-be-tested information based on the decompressed feature, to obtain reconstructed to-be-tested information;
a judging step of judging, based on a rebuild loss between the to-be-tested information and the reconstructed to-be-tested information, whether the to-be-tested information belongs to a known class or an unknown class; and
a classifying step of performing classification on the to-be-tested information, via the classification model having been trained, in a case where it is determined that the to-be-tested information belongs to the known class.

9. The method for classifying according to claim 8, wherein
in the judging step, in a case where the rebuild loss is less than or equal to a predetermined threshold, it is judged that the to-be-tested information belongs to the known class, and in a case where the rebuild loss is greater than the predetermined threshold, it is judged that the to-be-tested information belongs to the unknown class.

10. The method for classifying according to claim 8, wherein
the rebuild loss comprises a generation loss indicating a difference between the to-be-tested information and the reconstructed to-be-tested information and a latent loss indicating a matching degree between a distribution of the hidden feature and a specific distribution.

11. The method for classifying according to claim 8, wherein
in the classification model, a softmax loss is used to indicate a separation degree between different known classes; and
in the classifying step, the softmax loss is calculated using the hidden feature based on each of known classes, and
a loss function of the to-be-tested information comprises the rebuild loss and the softmax loss.

12. The method for classifying according to claim 10, wherein
in the classification model, a softmax loss is used to indicate a separation degree between different known classes; and
in the classifying step, the softmax loss is calculated using the hidden feature based on each of the known classes, and
a loss function of the to-be-tested information comprises the rebuild loss and the softmax loss.

13. The method for classifying according to claim 11, wherein
in the classifying step, a center loss indicating a distance between the hidden feature and a center hidden feature of each of known classes is further calculated, and
the loss function further comprises the center loss.

14. The method for classifying according to claim 12, wherein
in the classifying step, a center loss indicating a distance between the hidden feature and a center hidden feature of each of known classes is further calculated, and
the loss function further comprises the center loss.

15. An apparatus for classifying, comprising:
an extracting unit configured to extract a feature from to-be-tested information inputted to a classification model having been trained;
a compressing unit configured to compress the extracted feature into a low dimensional hidden feature capable of representing the to-be-tested information;
a decompressing unit configured to perform decompression on the hidden feature to obtain a decompressed feature;
a reconstructing unit configured to perform rebuild on the to-be-tested information based on the decompressed feature, to obtain reconstructed to-be-tested information;
a judging unit configured to judge, based on a rebuild loss between the to-be-tested information and the reconstructed to-be-tested information, whether the to-be-tested information belongs to a known class or an unknown class; and
a classifying unit configured to perform classification on the to-be-tested information, via the classification model having been trained, in a case where it is determined that the to-be-tested information belongs to the known class.

16. The apparatus for classifying according to claim 15, wherein the judging unit is configured to judge that the to-be-tested information belongs to the known class in a case where the rebuild loss is less than or equal to a predetermined threshold, and judge that the to-be-tested information belongs to the unknown class in a case where the rebuild loss is greater than the predetermined threshold.

17. The apparatus for classifying according to claim 15, wherein the rebuild loss comprises a generation loss indicating a difference between the to-be-tested information and the reconstructed to-be-tested information and a latent loss indicating a matching degree between a distribution of the hidden feature and a specific distribution.

18. The apparatus for classifying according to claim 15, wherein in the classification model, a softmax loss is used to indicate a separation degree between different known classes; and the classifying unit is configured to calculate the softmax loss using the hidden feature based on each of known classes, and a loss function of the to-be-tested information comprises the rebuild loss and the softmax loss.

19. The apparatus for classifying according to claim 17, wherein in the classification model, a softmax loss is used to indicate a separation degree between different known classes; and the classifying unit is configured to calculate the softmax loss using the hidden feature based on each of known classes, and a loss function of the to-be-tested information comprises the rebuild loss and the softmax loss.

20. The apparatus for classifying according to claim 18, wherein the classifying unit is further configured to calculate a center loss indicating a distance between the hidden feature and a center hidden feature of each of known classes, and the loss function further comprises the center loss.

* * * * *